United States Patent
Li et al.

(10) Patent No.: US 10,386,502 B2
(45) Date of Patent: Aug. 20, 2019

(54) DUAL ENERGY DETECTOR AND RADIATION INSPECTION SYSTEM

(71) Applicant: NUCTECH COMPANY LIMITED, Beijing (CN)

(72) Inventors: Shuwei Li, Beijing (CN); Qingjun Zhang, Beijing (CN); Ziran Zhao, Beijing (CN); Junxiao Wang, Beijing (CN); Xiang Zou, Beijing (CN); Bozhen Zhao, Beijing (CN); Lifeng Sun, Beijing (CN); Yongqiang Wang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/853,961

(22) Filed: Dec. 26, 2017

(65) Prior Publication Data

US 2018/0180746 A1  Jun. 28, 2018

(30) Foreign Application Priority Data

Dec. 23, 2016 (CN) .......................... 2016 1 1205087

(51) Int. Cl.
*G01T 1/20* (2006.01)
*G01V 5/00* (2006.01)

(52) U.S. Cl.
CPC .......... *G01T 1/2018* (2013.01); *G01V 5/0016* (2013.01)

(58) Field of Classification Search
CPC ... G01T 1/2018; G01V 5/0016; A61B 6/4233; A61B 6/4241; A61B 6/482
(Continued)

(56) References Cited

U.S. PATENT DOCUMENTS 4,149,081 A    4/1979 Seppi
4,845,363 A *  7/1989 Akai ..................... G01T 1/1644
                                                         250/368

(Continued)

FOREIGN PATENT DOCUMENTS

EP    1063538 A2   12/2000
EP    3029452 A1    6/2016

(Continued)

OTHER PUBLICATIONS

European Search Report dated Jun. 7, 2016 in the corresponding EP application (application No. 17210653.6).

*Primary Examiner* — David P Porta
*Assistant Examiner* — Gisselle Gutierrez
(74) *Attorney, Agent, or Firm* — Kilpatrick Townsend & Stockton LLP

(57) ABSTRACT

The present application relates to a dual energy detector and a radiation inspection system. The dual energy detector comprises: a detector module mount and a plurality of detector modules. The detector module includes a higher energy detector array and a lower energy detector array, which are juxtaposedly provided on said detector module mount to be independently irradiated. The present application may simplify the arrangement of the photodiodes and printed circuit boards to which the higher and lower energy detector arrays are connected, such that necessary thickness dimension of the detector module mount is reduced, thereby facilitating the installation and use of the dual energy detector of the present application. On the other hand, the radiation beam in the present application may be independently irradiated to the higher and lower energy detector arrays juxtaposed to each other, which reduces to certain extent the mutual restriction during selection of the higher and lower energy detector arrays.

10 Claims, 3 Drawing Sheets

(58) Field of Classification Search
USPC ............. 250/361 R, 370.09; 378/5, 19, 98.8, 378/98.9, 98.11
See application file for complete search history.

(56) References Cited

U.S. PATENT DOCUMENTS

| | | | |
|---|---|---|---|
| 2007/0158573 A1* | 7/2007 | Deych | G01T 1/2018 |
| | | | 250/370.11 |
| 2007/0172027 A1 | 7/2007 | Li et al. | |
| 2010/0284515 A1 | 11/2010 | Agrawal et al. | |
| 2012/0236987 A1 | 9/2012 | Ruimi et al. | |
| 2013/0208857 A1* | 8/2013 | Arodzero | G01T 1/2006 |
| | | | 378/57 |
| 2013/0327947 A1* | 12/2013 | Ronda | G01T 1/1644 |
| | | | 250/362 |
| 2014/0328463 A1* | 11/2014 | Lughausen | G01N 23/04 |
| | | | 378/62 |
| 2017/0059721 A1* | 3/2017 | Simanovsky | G01T 1/2018 |
| 2017/0217784 A1* | 8/2017 | Nitta | G01T 1/20 |

FOREIGN PATENT DOCUMENTS

| | | |
|---|---|---|
| JP | S6271881 A | 4/1987 |
| JP | H03273687 A | 12/1991 |
| JP | 2014535035 A | 12/2014 |
| WO | 2016052616 A1 | 4/2016 |

\* cited by examiner

US 10,386,502 B2

DUAL ENERGY DETECTOR AND RADIATION INSPECTION SYSTEM

RELATED APPLICATION

The present application claims priority from Chinese application number CN201611205087.1 filed Dec. 23, 2016, which is herein incorporated by reference.

FIELD OF THE INVENTION

The present application relates to the field of radiation inspection, and in particular relates to a dual energy detector and a radiation inspection system.

BACKGROUND OF THE INVENTION

In the existing radiation inspection system, the radiation beam emitted by a radiation source located on one side of a system after passing through a collimator may form a "sector" beam surface. The detector module is located on the other side of the system, and an inspected object is between the radiation beam and the detector module. As shown in FIG. 1, the radiation beam a5 emitted by the radiation source a1 after penetrating the inspected object a2, is emitted towards a plurality of detector modules a4 on a detector module mount a3. The existing detector module usually consists of certain amount of higher energy and lower energy detector arrays. All the detector modules are oriented towards a radiation source point.

For a dual energy detector, as shown in FIG. 2, the lower energy detector array a41 and the higher energy detector array a45 are generally provided in a front-and-rear positional relation. Wherein, the lower energy detector array a41 is located on one side proximate to the radiation source a1, while the higher energy detector array a45 is disposed on one side distant from the radiation source a1. The radiation beam a5 penetrates the lower energy detector array a41 before reaching the higher energy detector array a45. The lower energy detector array a41 relatively absorbs more energy of low energy rays, and the higher energy detector array a45 relatively absorbs more high energy rays. Finally, such two signals are analyzed to obtain information of an effective atomic number of an inspected substance. A photodiode a42 and a printed circuit board a43 are provided on a rear side of the lower energy detector array a41, and a photodiode a46 and a printed circuit board a47 are provided on a rear side of the higher energy detector array a45. In use, the lower energy detector array a41, in addition to acquiring the low energy signal, also assumes the filtering function of the higher energy detector array a45 by means of a filter a44.

The structure of this existing dual-energy detector is very universal at present, and in the specific implementation, there are the following problems:

1. Each detector module has a fixed orientation at the installation location. The orientation is directed to a target point of the radiation source. The design is relatively complicated and the installation and debugging are very difficult. Moreover, if the overall geometry varies (such as a position of the radiation source), the entire detector module mount needs to be re-designed. Further, in order to stably install the detector module, the detector module mount needs to be made to be relatively thick, so that it is quite inconvenient in terms of installation and use.

2. The detector modules are so unsmooth therebetween that, the detector at an edge of an edge module is susceptible to scattering interference.

3. The sensitive medium of the lower energy detector array is limited in an optional range, and thus is not a desirable filtering material. For the lower energy detector array, the area of the photodiodes on a rear side thereof may generally be less than the area of the lower energy detector array, but does not match the sensitive area of the lower energy detector.

4. In actual use, the width of the radiation beam at the detector module which is difficult to be constrained to the width of a sensitive area of the detector, may generally substantially exceed the width of a single detector array, resulting in an additional radiation protection pressure.

SUMMARY OF THE INVENTION

It is an object of the present application to provide a dual energy detector and a radiation inspection system that facilitates the installation and use of the dual energy detector.

In order to achieve the aforementioned object, the present application provides a dual energy detector, comprising: a detector module mount and a plurality of detector modules, the detector module including a higher energy detector array and a lower energy detector array, which are juxtaposedly provided on the detector module mount to be independently irradiated.

Further, the higher energy detector array and the lower energy detector array in each of the detector modules are disposed such as to be adjacent to each other.

Further, a plurality of the detector modules are adjacently disposed on a same mounting plane of the detector module mount.

Further, the plurality of the detector modules are arranged on the detector module mount along a linear sequence.

Further, a plurality of the detector modules are provided in a plurality of rows on the mounting plane of the detector module mount, each row of the detector modules being adjacently disposed in parallel.

Further, a heavy metal spacer is provided among various detector units included in the higher energy detector array and/or the lower energy detector array.

Further, a filter is further provided at one side of the higher energy detector array proximate to a radiation source.

Further, the density of sensitive medium of the higher energy detector array is higher than that of the lower energy detector array, and/or the effective atomic number of sensitive medium of the higher energy detector array is higher than that of the lower energy detector array.

Further, the scintillation efficiency of sensitive medium of the lower energy detector array is higher than that of the higher energy detector array.

In order to realize the aforementioned object, the present application provides a radiation inspection system, comprising the aforementioned dual energy detector.

On the basis of the aforementioned technical solution, the present detector provides the higher and lower energy detector arrays in the detector module relative to the same mounting plane of the detector module mount according to a juxtaposed manner, and such structure may simplify the arrangement of the photodiodes and printed circuit boards to which the higher and lower energy detector arrays are connected, such that necessary thickness dimension of the detector module mount is reduced, thereby facilitating the installation and use of the dual energy detector of the present application. On the other hand, relative to the form that the radiation beam needs to penetrate the lower energy detector array before reaching the higher energy detector array when the existing dual energy detector receives the radiation by the radiation source, the radiation beam in the present application may be independently irradiated to the higher and lower energy detector arrays juxtaposed to each other, which reduces to certain extent the mutual restriction during selection of the higher and lower energy detector arrays.

BRIEF DESCRIPTION OF THE ACCOMPANYING DRAWINGS

The drawings described herein are used to provide a further understanding of the present application and constitute a part of the present application. The illustrative embodiments of the present application as well as the descriptions thereof, which are used for explaining the present application, do not constitute improper definitions on the present application. In the drawings.

DETAILED DESCRIPTION OF THE PREFERRED EMBODIMENTS

Next, the technical solution of the present application is further described in detail by means of the drawings and embodiments.

Figure 1:
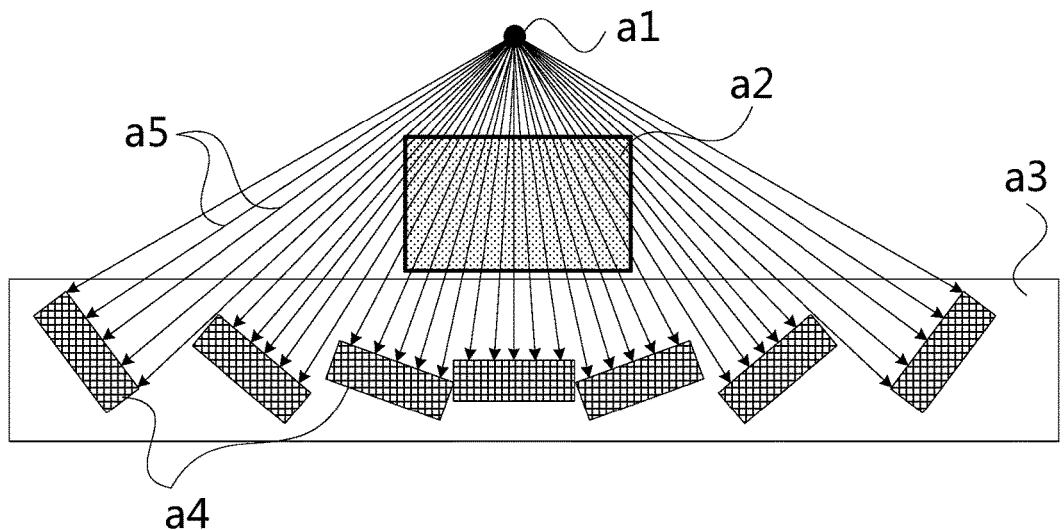
FIG. 1 is a schematic view for the principles of the existing radiation inspection system.
Figure 2:
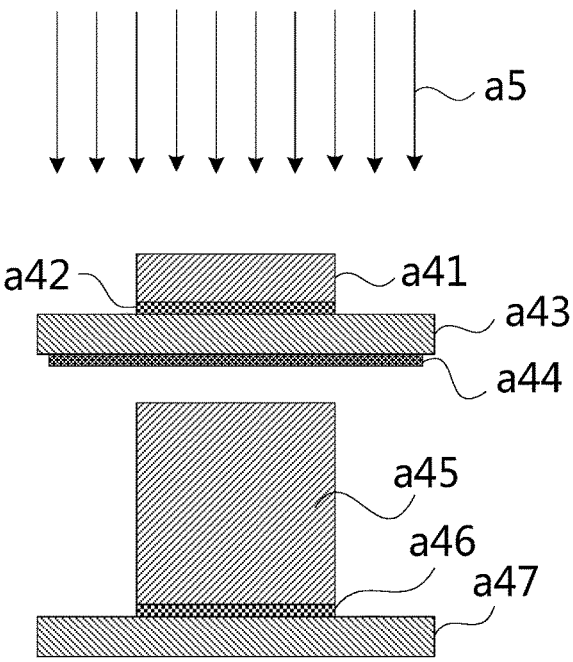
FIG. 2 is a schematic view of the structure of the detector module in the existing dual energy detector.
Figure 3:
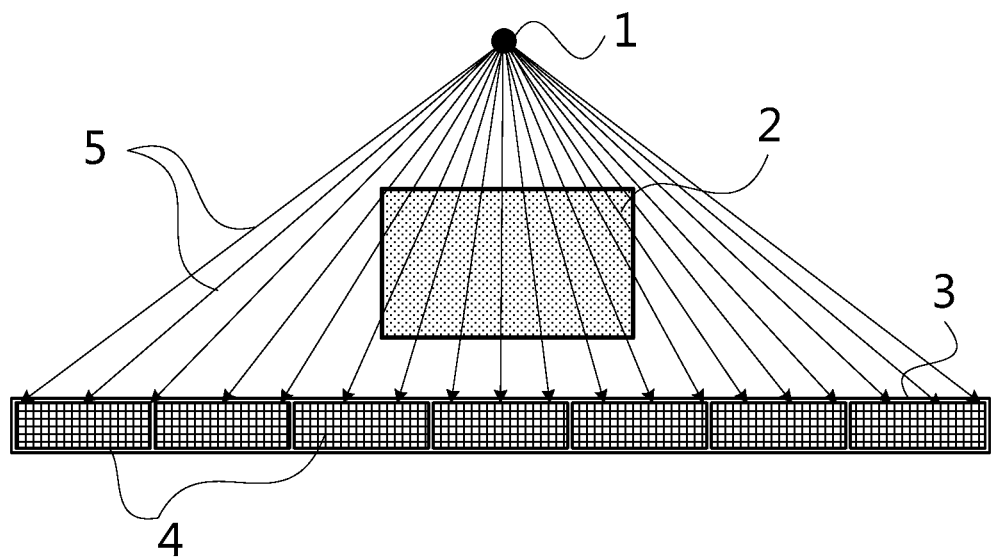
FIG. 3 is a schematic view for the principles of an embodiment of the radiation inspection system of the present application.

As shown in FIG. 3, it is a schematic view for the principles of an embodiment of the radiation inspection system of the present application. In FIG. 3, the radiation source 1 emits the radiation beam 5 to the dual energy detector of the present application to form a beam surface, and the inspected object 2 is disposed in a range covered by the beam surface. The dual energy detector includes a detector module mount 3 and a plurality of detector modules 4. The plurality of detector modules 4 are juxtaposedly disposed on the same mounting plane of the detector module mount 3, and the respective various detector modules 4 are oriented parallel to each other. Compared with the structural form that the detector modules of the existing dual energy detector are respectively oriented towards a target point of the radiation source 1, as the various detector modules 4 in the present embodiment occupy a small dimension in a thickness direction, the detector modules 4 are more simple in terms of design, installation and debugging on the detector module mount 3, and moreover, the detector module mount 3 is also relatively small in thickness and also relatively light in weight, so that it is also comparatively convenient during the folding or driving of the detector module mount 3.

In order to reduce the scattering interference to which the edge of the detector modules is subject, it is preferable that a plurality of detector modules 4 are adjacently disposed on the same mounting plane of the detector module mount 3. In other words, the detector modules 4 are adjacent to each other at an edge position, thereby reducing the scattered light entering the detector modules 4 from the edge position such as to make more smooth transition of the received signals between adjacent detector modules.

Figure 5:
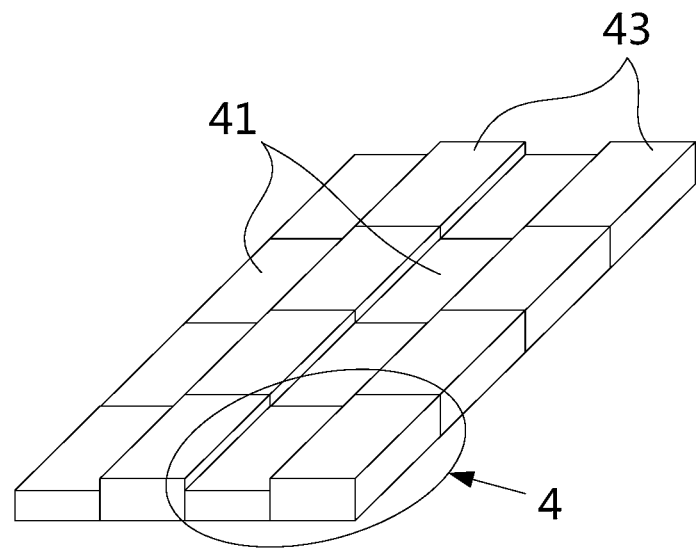
FIG. 5 is a schematic view of the structure of providing higher and lower energy detector arrays in various detector modules in another embodiment of the dual energy detector of the present application.

In the arrangement manner of the detector modules 4, it is preferable that the plurality of the detector modules 4 are arranged on the detector module mount 3 along a linear sequence during design, and such structure only needs to occupy less thickness dimension of the detector module mount 3, and moreover, it is also very convenient during the installation. In a further embodiment (as shown in FIG. 5), a plurality of the detector modules 4 may also be provided in a plurality of rows on the mounting plane of the detector module mount 3, each row of the detector modules 4 being adjacently disposed in parallel. A plurality of rows of detector modules 4 may effectively improve the scanning speed of the inspected object 2.

Figure 4:
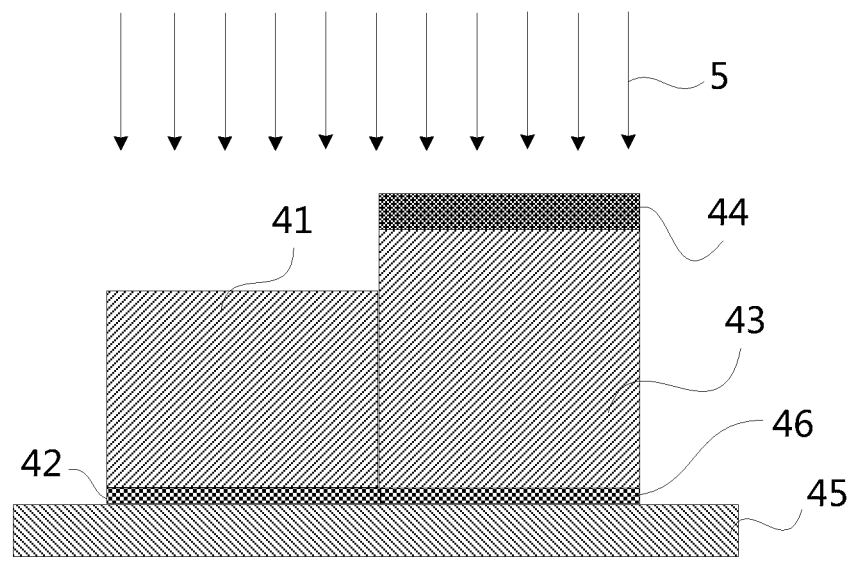
FIG. 4 is a schematic view of the structure of the detector modules in an embodiment of the dual energy detector of the present application.

With reference to FIG. 4, the detector module 4 includes a higher energy detector array 43 and a lower energy detector array 41, and the higher energy detector array 43 and the lower energy detector array 41 may both formed by sequentially arranging a plurality of detector units. Compared with the front-and-rear arrangement of the lower energy detector array and the higher energy detector array in the existing dual energy detector, the higher energy detector array 43 and the lower energy detector array 41 are juxtaposedly provided relative to a same mounting plane of the detector module mount 3.

It is necessary to explain that the "high energy" and "low energy" detector arrays are relatively defined in the art. In general, the radiation beam is a broad energy spectrum structure, in which partial rays with a low energy are easily absorbed by a substance. Among them, the higher energy detector array relatively absorbs more high energy radiation portions, while the lower energy detector array relatively absorbs more low energy radiation portions.

In FIG. 4, the photodiode 46 below the higher energy detector array 43 is substantially in the same plane as the photodiode 42 below the lower energy detector array 41, and the higher energy detector array 43 and the lower energy detector array 41 share the same printed circuit board 45. This results in that the maximum thickness of the detector module is the thickness of the higher energy detector array 43 (further plus the thickness of the filter 44, if there is a filter 44) plus the thicknesses of the photodiode 46 and the printed circuit board 45. Moreover, the arrangement manner of the existing dual energy detector determines that the thickness of the detector module is at least a sum of the thicknesses of the higher energy detector array a45 and the lower energy detector array a41, further plus the thicknesses of the photodiode and the printed circuit board connected thereto respectively, so that it is apparent that this is considerably greater than the thickness of the detector module in the present application. This further determines that there is a small necessary thickness dimension of the detector module mount in the embodiments of the present application, thereby facilitating the installation and use of the dual energy detector of the present application.

Judged from the irradiation line of the radiation source, when the existing detector receives the irradiation by the radiation source, the radiation beam a5 needs to penetrate the lower energy detector array a41 before reaching the higher energy detector array a45. Such irradiation line inevitably affects the selection of the performance of the lower energy detector array a41 and the higher energy detector array a45, especially the low-energy detector array a41. Moreover, in the present embodiment, the radiation beam 5 in the present application may be independently irradiated to the higher energy detector array 41 and the lower energy detector array 43 juxtaposed to each other, which reduces to certain extent the mutual restriction during selection of the higher and lower energy detector arrays. Further, such arrangement manner may also simplify the adjustment of the energy response and sensitivity to the radiation beam between the higher and lower energy detector arrays.

In order to reduce the scattering interference of the higher energy detector array 43 and the lower energy detector array 41 at an edge position, it is preferable that the higher energy detector array 43 and the lower energy detector array 41 in each of the detector modules 4 are disposed such as to be adjacent to each other. The juxtaposed higher and lower energy detector arrays which may effectuate a large sensitive area of the detector, can match the width of the radiation beam, so as to more effectively utilize the width of the radiation beam, and reduce the radiation protection pressure.

In selection of the performance of the sensitive medium of the higher and lower energy detector arrays, it is preferable that the density of sensitive medium of the higher energy detector array 43 is higher than the density of sensitive medium of the lower energy detector array 41, and/or the effective atomic number of sensitive medium of the higher energy detector array 43 is higher than the effective atomic number of sensitive medium of the lower energy detector array 41. The higher energy detector array is made by choosing a sensitive medium of a higher density and/or effective atomic number, such as to reduce the effects of crosstalk when the rays obliquely irradiate the sensitive medium. In addition, it is preferable that the scintillation efficiency of sensitive medium of the lower energy detector array 41 is higher than the scintillation efficiency of sensitive medium of the higher energy detector array 43, so as to improve the sensitivity of the lower energy detector array 41.

In FIG. 4, a filter 44 may be further provided on a front side of the higher energy detector array 43. Compared with the lower energy detector array in the existing dual energy detector which also needs to assume the filtering function of the higher energy detector array, as the lower energy detector array 41 is juxtaposedly disposed beside the higher energy detector array 43, the lower energy detector array 41 does not possess a filtering function of the higher energy detector array, while the filtering function is realized by the filter 44, such that the filtering function may no longer be considered when the sensitive medium of the lower energy detector array 41 is selected, such as to expand the selection range of the sensitive medium of the lower energy detector array 41. Correspondingly, the higher energy detector array 43 may choose a proper material and dimension of the filter 44 according to own requirements, so that it is more simple in design. After the filter 44 is added, it is preferable that the sum of the thicknesses of the higher energy detector array 43 and the filter 44 is higher than the thickness of the lower energy detector array 41.

Figure 6:
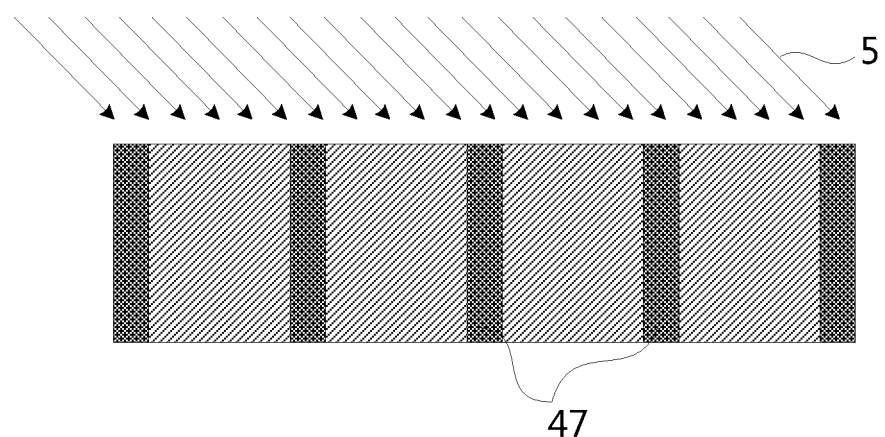
FIG. 6 is a schematic view of the structure of providing a heavy metal spacer between various detector units in the higher and lower energy detector arrays in a further embodiment of the dual energy detector of the present application.

In order to further reduce the scattering between adjacent detector units, a heavy metal spacer may also be provided between the detector units. Take a further embodiment of the dual energy detector of the present application as shown in FIG. 6 for example, in FIG. 6, a heavy metal spacer 47 provided between various detector units constituting the higher and lower energy detector arrays, may effectively reduce the scattered light scattered from an edge of a detector unit to another detector unit adjacent thereto.

The aforementioned embodiments of various dual energy detectors may be applied to various fields, especially applied to the radiation inspection system. Therefore, the present application also provides a radiation inspection system comprising any one of the foregoing dual energy detectors for effectuating scanned inspection of an inspected object.

Finally, it should be explained that: the aforementioned embodiments are only used to describe the technical solution of the present application rather than limiting the same; although detailed explanations are made to the present application by referring to preferred embodiments, a common technical person in the art should understand that: it is still possible to make amendments to the embodiments of the present application or make equivalent replacements to part of the technical features; without departing from the spirit and scope of the present application, they should all be covered in the scope of the technical solution for which protection is sought in the present application.

The invention claimed is:

1. A dual energy detector, comprising: a detector module mount and a plurality of detector modules, said detector module comprising a higher energy detector array and a lower energy detector array, wherein the higher energy detector array and the lower energy detector array are juxtaposedly provided relative to the same mounting plane on said detector module mount to be independently irradiated by radiation beam from a radiation source, a photodiode below the higher energy detector array is in the same plane as a photodiode below the lower energy detector array, and the higher energy detector array and the lower energy detector array share the same printed circuit board.

2. The dual energy detector according to claim 1, wherein said higher energy detector array and said lower energy detector array in each of said detector modules are disposed to be adjacent to each other.

3. The dual energy detector according to claim 1, wherein a plurality of said detector modules are adjacently disposed on a same mounting plane of said detector module mount.

4. The dual energy detector according to claim 3, wherein the plurality of said detector modules are arranged on said detector module mount along a linear sequence.

5. The dual energy detector according to claim 3, wherein a plurality of said detector modules are provided in a plurality of rows on the mounting plane of said detector module mount, each row of said detector modules being adjacently disposed in parallel.

6. The dual energy detector according to claim 1, wherein a heavy metal spacer is provided among various detector units included in said higher energy detector array and/or said lower energy detector array.

7. The dual energy detector according to claim 1, wherein a filter is provided at one side of said higher energy detector array proximate to a radiation source.

8. The dual energy detector according to claim 1, wherein the density of sensitive medium of said higher energy detector array is higher than that of said lower energy detector array, and/or the effective atomic number of sensitive medium of said higher energy detector array is higher than that of said lower energy detector array.

9. The dual energy detector according to claim 1, wherein the scintillation efficiency of sensitive medium of said lower energy detector array is higher than that of said higher energy detector array.

10. A radiation inspection system, comprising:
a radiation source; and the dual energy detector according to claim 1, wherein the higher energy detector array and the lower energy detector array are juxtaposedly provided relative to the same mounting plane on said detector module mount to be independently irradiated by radiation beam from the radiation source.

\* \* \* \* \*